United States Patent [19]

Anayama

[11] Patent Number: 5,465,125
[45] Date of Patent: Nov. 7, 1995

[54] METHOD OF DETECTING INCLINATION ANGLE OF IMAGE FRAME READ BY MICROFILM READER

[75] Inventor: Ushio Anayama, Kanagawa, Japan

[73] Assignee: Fuji Photo Film Co., Ltd., Kanagawa, Japan

[21] Appl. No.: 267,238

[22] Filed: Jun. 29, 1994

[30] Foreign Application Priority Data

Jun. 30, 1993 [JP] Japan ................................ 5-183528

[51] Int. Cl.$^6$ ................................................ G03B 21/00
[52] U.S. Cl. ................................................ 353/26 A
[58] Field of Search ................................ 353/25, 26 R, 353/26 A, 27 R, 27 A, 81, 121, 122; 355/40, 41, 39; 250/556, 559, 560, 561, 562, 563; 364/525

[56] References Cited

U.S. PATENT DOCUMENTS

| | | |
|---|---|---|
| 4,219,737 | 8/1980 | Gagnon et al. .................. 353/26 A |
| 4,611,907 | 9/1986 | Inatsuki ........................... 353/41 |
| 5,354,994 | 10/1994 | Hicks .............................. 383/26 A |

FOREIGN PATENT DOCUMENTS

| | | | |
|---|---|---|---|
| 0003445 | 1/1979 | Japan | ................ 353/27 A |
| 0115154 | 5/1988 | Japan | ................ 353/25 |

*Primary Examiner*—William A. Cuchlinski, Jr.
*Assistant Examiner*—William C. Dowling
*Attorney, Agent, or Firm*—Sughrue, Mion, Zinn, Macpeak & Seas; Richard C. Turner; Steven M. Gruskin

[57] ABSTRACT

A method of determining an inclination angle of a rectangular image frame read by a microfilm reader at high accuracy. The method is characterized in that the inclination angle of the bottom side line of the image frame is detected to determine the inclination angle of the image. In a preferred embodiment, the bottom side line is discriminated by comparing the projected lengths of the two side lines opposing to the bottom side of the display screen of the microfilm reader, and the side line having the projected length greater than the projected length of the other side line is discriminated as the bottom side line of the image frame.

7 Claims, 3 Drawing Sheets

METHOD OF DETECTING INCLINATION ANGLE OF IMAGE FRAME READ BY MICROFILM READER

BACKGROUND OF THE INVENTION

1. Field of the Invention

The present invention relates to a method of detecting the inclination angle of the image frame of the image read by a microfilm reader.

2. Prior Art Statement

The document images photographed on a microfilm include some images which have been photographed in inclined postures. When one of such images photographed in inclined postures is projected on a screen, the projected image is also inclined. In reading such an image, the inclined projected image must be rotated by an image rotating prism which is assembled in the optical system of the microfilm reader.

Accordingly, the known microfilm reader has means for automatically detecting the inclination angle of the projected image and rotating the projected image to correct the posture of the projected image. The inclination angle of the projected image is determined by determining the inclination angle of the rectangular image frame, i.e. the contour of the coverage of the document image. For example, when the image photographed on the microfilm is a negative image, the background portion in each image frame is blackened and a white frame region constituted by white picture elements surrounds each image frame. Thus, the inclination angle of each image frame can be determined by detecting the inclination angle of one of the four sides of rectangular image frame, which are boundaries between the image region and the white frame region.

In the conventional system, the negative image projected on the screen is scanned along the main scanning line to read the picture elements continuously. In detail, when black picture elements are sensed continuously it is discriminated that the scanned range is within the image region. On the contrary, when white or bright picture elements are sensed continuously, it is discriminated that the scanned range is out of the image region, i.e. within the white frame range. The coordinates of the boundary separating the continuous white picture element range from the continuous black picture element range are determined to discriminate the image frame. The inclination angle of each image frame is detected by measuring the inclination angle of one of four straight image framing lines.

In the conventional system, the inclination angle of each image frame is determined by detecting the inclination angle of the top side line of the image frame. For instance, the coordinates of both end points of the top side line are determined to set up the equation showing the straight line connecting the end or corner points, or the top side line is determined by the least squares method using the coordinates of the points located on the top side edge or line of the image frame.

However, original documents are usually stacked and stapled by a stapler, so that the upper left or upper right corner of each original document is often damaged. It is a common practice that the original documents are stacked while the bottom side edges of the documents are aligned, for example, on the surface of a desk. Accordingly, the original document stack is stored while the bottom side edges of the thus stacked original documents are aligned. As a result, the bottom side edges of the original documents are protected from being injured, while the top side edges of the original documents tend to be injured. When the inclination angle of the photographed image is determined by detecting the inclination angle of the top side line or edge of the image frame, the accuracy in detecting the inclination angle becomes poor.

OBJECT AND SUMMARY OF THE INVENTION

The present invention has been accomplished under the circumstances as aforementioned, and the object thereof is to provide a method of detecting the inclination angle of the projected image read by a microfilm reader at high accuracy.

The object of the invention is attained by the provision of a method of determining an inclination angle of an image frame of a rectangular projected image, which is read by a microfilm reader and projected on a screen of the microfilm reader, comprising the step of detecting an inclination angle of a bottom side line of the image frame so as to determine the inclination angle of the image frame.

When the image projected on the screen is inclined, two sides of the image frame are opposed to or projected on the bottom side of the screen without crossing other side line of the image frame of the projected image. It is desirous that the inclination angle of the side of the image frame having the projected length larger than the projected length of the other side line is discriminated as the inclination angle of the bottom side edge.

EMBODIMENT OF THE INVENTION

Figure 1:
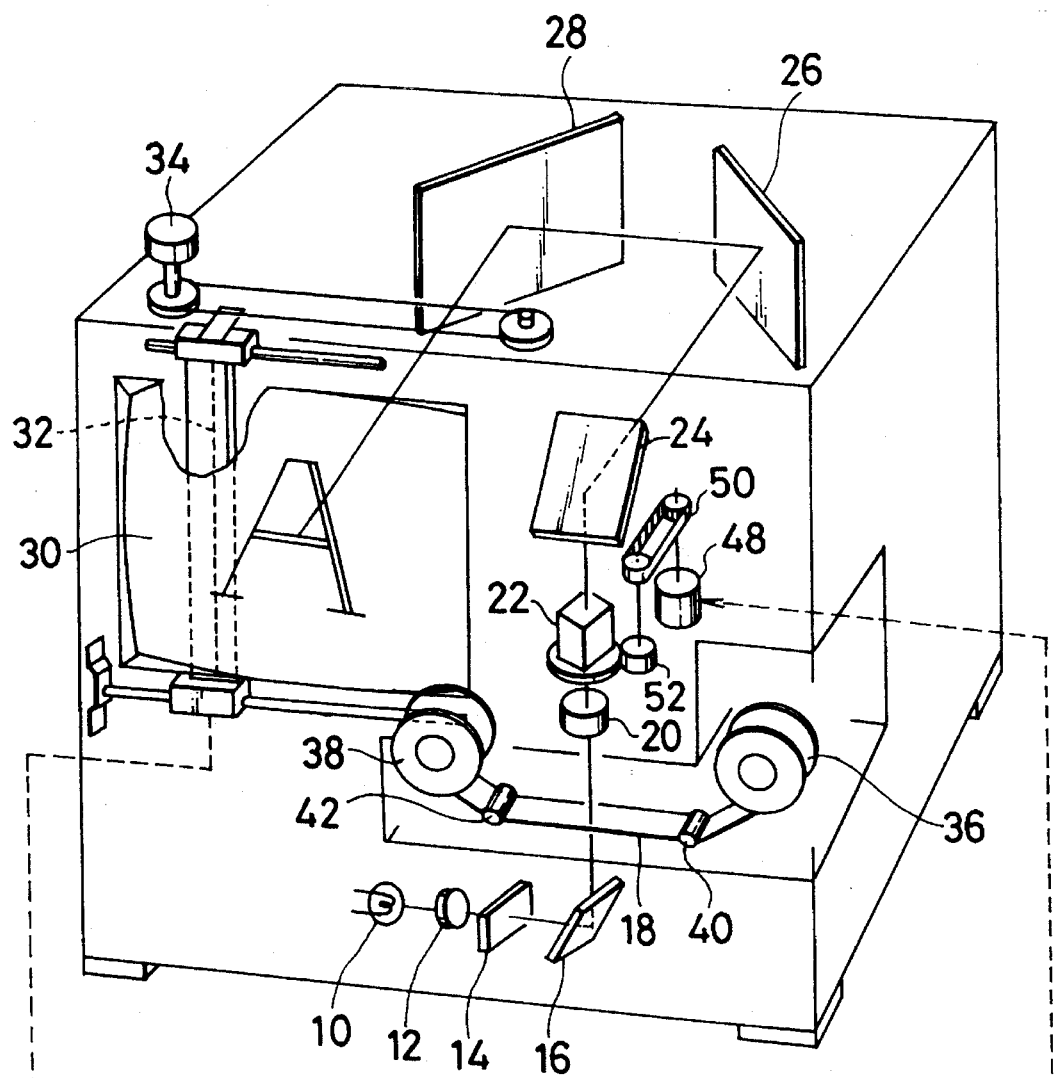
FIG. 1 is a perspective view showing an embodiment of the microfilm reader by which the method of the invention is practised.
Figure 1:
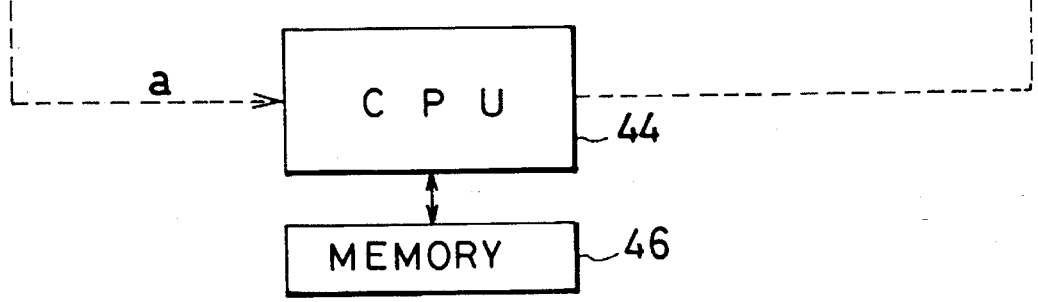

In FIG. 1, reference numeral 10 designates a light source, and the light from the light source 10 is passed through a condenser lens 12, a heat resistant glass mirror 14, a cold mirror 16, a negative microfilm 18, a projection lens 20, an image rotating prism 22, and mirrors 24, 26, 28 to a transmitting screen 30 on which an image photographed on the microfilm 18 is projected in an enlarged scale.

A CCD line sensor 32 is provided at the backside of the screen 30 to be moved in the horizontal direction. The line sensor 32 extends to traverse the vertical elongation of the screen 30 to read out the image along the lengthwise direction thereof (main scanning direction) to generate image signals successively as the time series signals, whereby scanning along the main scanning direction is effected. The line sensor 32 is moved in the horizontal direction by means of a motor 34 to scan along the subsidiary scanning direction.

The microfilm 18 is contained in a cassette or a cartridge and fed from a supply reel 36 to be taken up by a take-up reel 38. The microfilm 18 is guided by guide rollers 40, 42 to run beneath the projection lens 20 along the horizontal plane between the reel 36 and the reel 38.

The image signal a, which is the output signal from the line sensor 32, is processed to correct scattering of picture elements and then put into a band pass filter from which the signal is passed through a rectifier circuit, an integration circuit, an A/D converter and an input interface into a CPU 44. Reference numeral 46 designates a memory in which an operation program for the CPU 44 and data concerning the prism 22 and/or the lens 20 are stored.

In the illustrated embodiment, the prism 22 is rotated by a motor 48 to correct the inclination of the projected image. The motor 48 rotates the prism 22 through a cog belt 50 and a reduction gear 52. The motor 48 may be a stepping motor or a servo motor, and the rotation angle of the motor 48 is detected.

The operation of the illustrated embodiment will be described with reference to FIGS. 2 and 3. As shown in FIG. 3, when a document image $P_0$ having a rectangular contour is projected on the screen 30, the line sensor 32 scans the image along the X axis or direction (vertical direction in FIG. 3) to effect scanning along the main scanning line. A white region $P_w$ appears to surround the image region $P_0$.

By scanning the image along the main scanning line, white picture elements are sensed in the white frame region $P_w$ and black picture elements are sensed when the region within the image area $P_0$ is scanned. When the number of continuously sensed black picture elements reaches a predetermined number, it is judged that the scanned area is a part of the image region $P_0$ and the coordinates (X, Y) of the boundary point between the white frame $P_w$ and the image area $P_0$ are memorized. The main scanning line is moved successively along the subsidiary scanning direction (Y direction in FIG. 3) to memorize the coordinates forming the image frame $P_1$ which is the boundary between the white frame $P_w$ and the image area $P_0$.

Along the framing line AB of the image frame $P_1$ have values along the X axis decreasing as the values along the Y axis are increased. On the contrary, along the framing line AD of the image frame $P_1$ have values along the X axis increasing as the values along the Y axis are increased. It is judged that the extension, within which the values along the X axis of adjacent points on the image frame $P_1$ are successively increased or decreased, is included in one side edge of the image frame $P_1$. Thus, it is judged that the point at which the difference between the values along the X axis of adjacent points is changed from increase to decrease, or vice versa from decrease to increase, forms a corner of the image frame $P_1$.

When comparing the line AB to the line AD, the line AB formed by the points having the values along the X axis distributed within a range narrower than the distribution range of the values along the X axis of the points forming the line AD is judged to be the side edge opposing to the bottom side 30A of the screen 30. It becomes possible to settle the coordinates of the corner points A, B, C and D of the image frame $P_1$ and the two side lines AB and BC opposing to the bottom side 30A of the screen 30 (Step 100 in FIG. 2).

It is noted that a particular side of the image frame $P_1$ opposes the bottom side of the screen when the particular side is projected without transversing any other side of the image frame $P_1$.

The particular side line contains the point having the minimum coordinate value along the X axis. Accordingly, it is judged that the side lines containing the point having the minimum X-coordinate value, i.e. the side lines AB and BC, are the lower sides of the image frame $P_1$.

Then, the length LAB between the projected values on the Y axis of the points A and B is compared to the length $L_{BC}$ between the projected values on the Y axis of the points B and C (Step 102). Since the inclination of the image $P_0$ is generally small, when each side line of a rectangular image $P_0$ is projected on the bottom side 30A of the screen 30, it is easily discriminated that the projected length of the bottom side line of the image frame $P_1$ is sufficiently greater than the projected length of the right or left side edge. Accordingly, when the length $L_{AB}$ is greater than the length $L_{BC}$, it is judged that the side edge AB is the bottom side of the image frame $P_1$; whereas when the length $L_{BC}$ is greater than the length $L_{AB}$, it is judged that the side edge BC is the bottom side of the image frame $P_1$.

When $L_{AB} > L_{BC}$, the inclination angle of the line AB is determined. However, the corner portion of an original document is often folded, injured or stained. Thus, the portions Aa and bB, which are close to the corners A and B and separated from the points A and B by the projected length along the X axis of α, are deleted (Step 104), and the inclination angle $\theta_{ab}$ of the line ab is determined (Step 106).

The points a and b can be settled, as the points on the line AB, by substituting the values $Y_A$ and $Y_B$ along the Y axis by the values $Y_A \to Y_A + \alpha$ and $Y_B \to Y_B - \alpha$. α may be a positive constant or may be a certain proportion of the line AB. It is not essential that the value α takes the same value respectively for the point A and B.

CPU 44 generates a signal to rotate the prism 22 by means of the motor 52 (see FIG. 1) so that the inclination angle $\theta_{ab}$ becomes zero. In detail, by means of CPU 44, the rotation angle of the prism 22 required for rotating the image $P_0$ to the uninclined posture is obtained by referring to the conversion factor or interrelation between the rotation angle of the prism 22 and the rotation angle of the projected image $P_0$ (Step 108 in FIG. 2).

When $L_{AB} < L_{BC}$ (Step 102), it is judged that the line BC is the bottom side of the image frame $P_1$. In such a case, the inclination angle of the line BC is determined. Similar to the case where the line AB is the bottom side line of the image frame $P_1$, the portions Bb' and cC, which are close to the corner points B and C and separated from the points B and C by the projected length along the X axis of β, are deleted (Step 110) and the inclination angle $\theta_{b'c}$ of the line b'c is determined (Step 112). The inclination of the projected image $P_0$ is corrected so that the inclination angle $\theta_{b'c}$ becomes zero (Step 114).

In the embodiment described above, since the inclination angle $\theta_{ab}$ or $\theta_{b'c}$ has been determined by substituting the corner points A, B and C by the points a, b, b' and c, the inclination angle can be determined accurately by obviating the affects of any passable inconveniences such as folding, cut-out, injury or stain in the corner portion of the original document. Since the inclination angle of the photographed image is generally small, the difference between the length $L_{AB}$ and the length $L_{BC}$ is sufficiently large.

Figure 2:
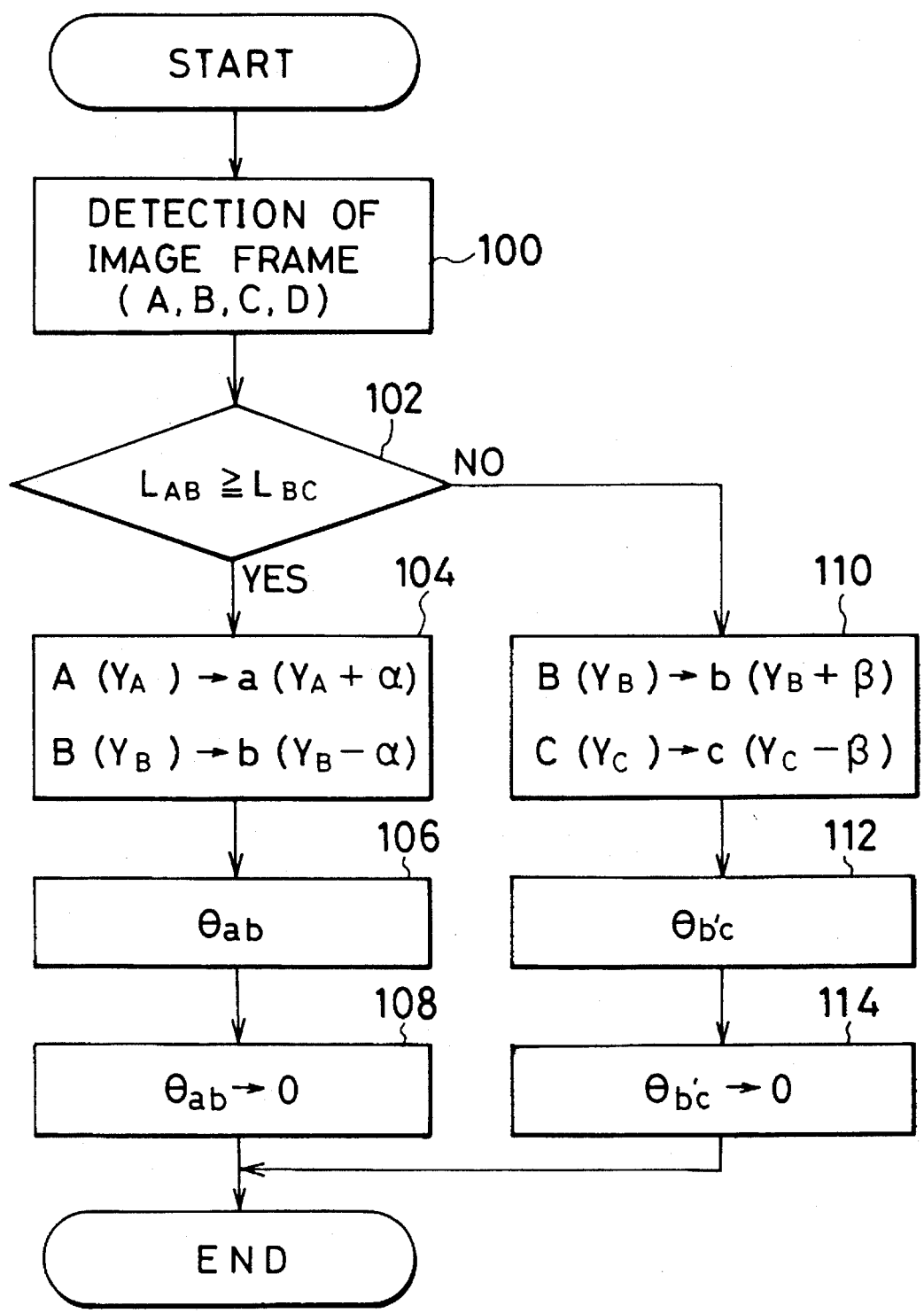
FIG. 2 is a flow chart showing the operation sequence of an embodiment of the invention.
Figure 3:
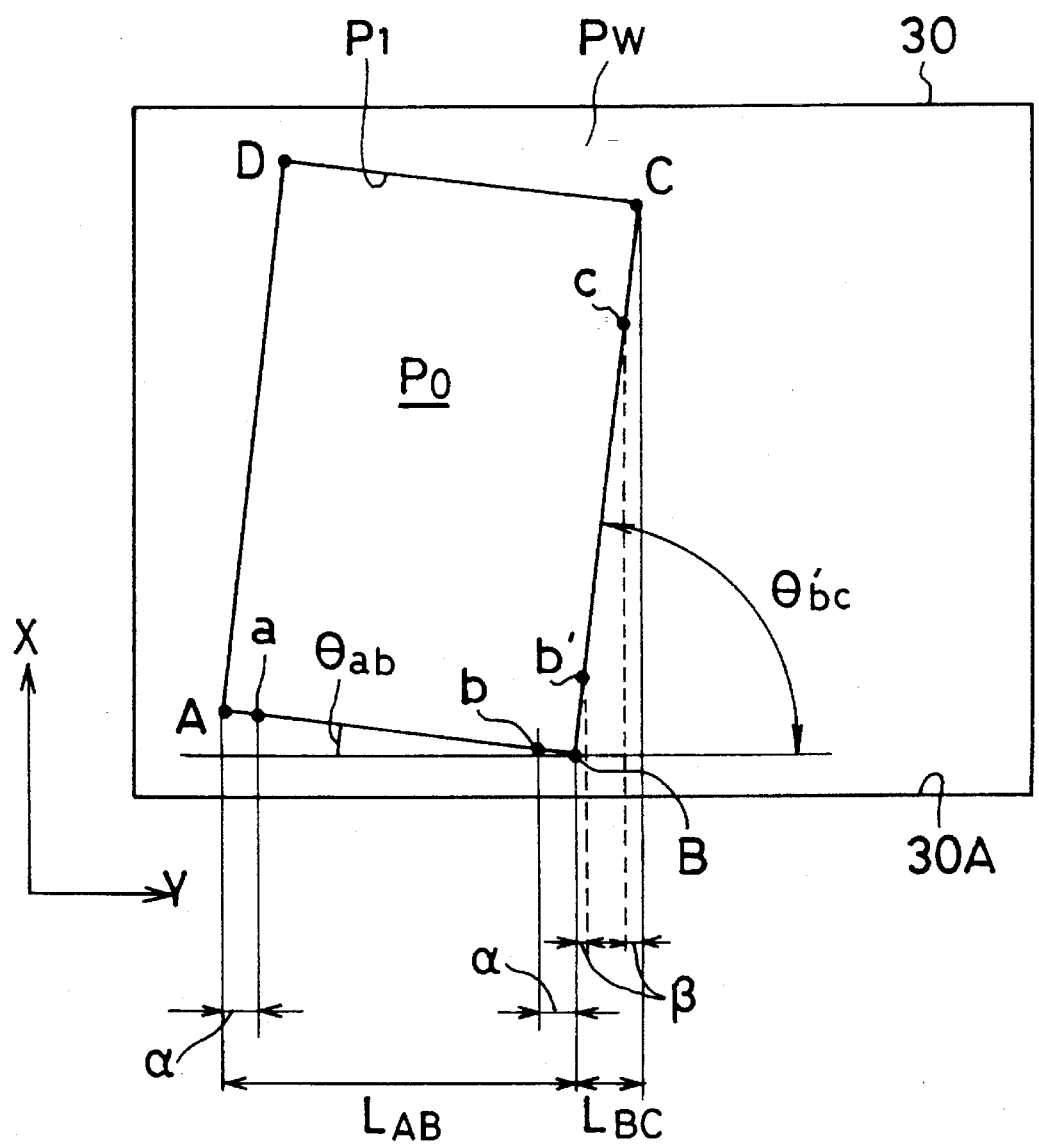
FIG. 3 is a diagram showing the image frame projected on the screen of the microfilm reader in an exemplified operation of the invention.

Accordingly, there is no problem to compare the length $L_{AB}$ with the length $L_{BC}$ by determining the coordinates of the coner points A, B, C and D directly from the image frame $P_1$ as done by the Step 100 shown in FIG. 2. However, the coordinates of the corner points A, B, C and D may also be determined by drawing four lines ab, b'c– – – – while deleting the portions close to the corners A to D and then the corner points A to D are determined as the intersecting points of the extentions of the four lines ab, b'c– – – –.

Although the bottom side line of the image frame $P_1$ of the image $P_0$ has been determined by comparing the length $L_{AB}$ with the length $L_{BC}$ projected on the bottom side 30A of the screen 30 in the illustrated embodiment, the bottom side line of the image $P_0$ may be determined by a simpler operation since the inclination angle of the image $P_0$ is generally small.

For example, from the two side lines opposing to the bottom side 30A of the screen 30, the side edge including the points having the coordinates along the X axis distributed within a smaller range is judged as the bottom side line of the image $P_0$.

According to the invention, since the inclination angle of the projected image is determined by detecting the inclination angle of the bottom side line of the image frame of the projected image, the accuracy in determination is improved since the inclination angle is determined by measuring the portions which is normally free from folding, injury, stain or other defect. The bottom side edge or line of the document image can be judged precisely by discriminating the bottom side line by comparing the lengths of the two side lines projectable on the bottom side of the screen without traversing other side lines.

What is claimed is:

1. A method of determining an inclination angle of an image frame of a rectangular projected image, which is read by a microfilm reader and projected on a screen of the microfilm reader, comprising a step of detecting an inclination angle of a bottom side line of the image frame to determine the inclination angle of the image frame, wherein lengths of two side lines of the image frame projected on a bottom side of said screen are compared with each other and the side line having the length greater than the length of the other side line is discriminated as said bottom side line of the image frame.

2. The method of claim 1, further comprising a step of deleting one or more corner portions of the image frame to prevent inaccuracies in the step of detecting the inclination angle.

3. A method of determining an inclination angle of an image frame of a rectangular projected image, which is read by a microfilm reader and projected on a screen of the microfilm reader, comprising a step of detecting an inclination angle of a bottom side line of the image frame to determine the inclination angle of the image frame, wherein lengths of two side lines of the image frame projected on a side of said screen are compared with each other and the side line having the length smaller than the length of the other side is discriminated as said bottom side line of the image frame.

4. The method of claim 3, further comprising a step of deleting one or more corner portions of the image frame to prevent inaccuracies in the step of detecting the inclination angle.

5. A method of determining an inclination angle of an image frame of a rectangular projected image, which is read by a microfilm reader and projected on a screen of the microfilm reader, comprising a step of detecting an inclination angle of a bottom side line of the image frame to determine the inclination angle of the image frame, wherein lengths of two side lines of the image frame are compared with each other and the side line having coordinates along a vertical axis of the screen distributed within a smaller range along the vertical axis is determined to be the bottom side line of the image frame.

6. The method recited in claim 5, wherein the two side lines oppose a bottom side of said screen.

7. The method of claim 5, further comprising a step of deleting one or more corner portions of the image frame to prevent inaccuracies in the step of detecting the inclination angle.

* * * * *